May 25, 1937.  T. B. TYLER  2,081,689
TRANSMISSION
Filed June 8, 1932
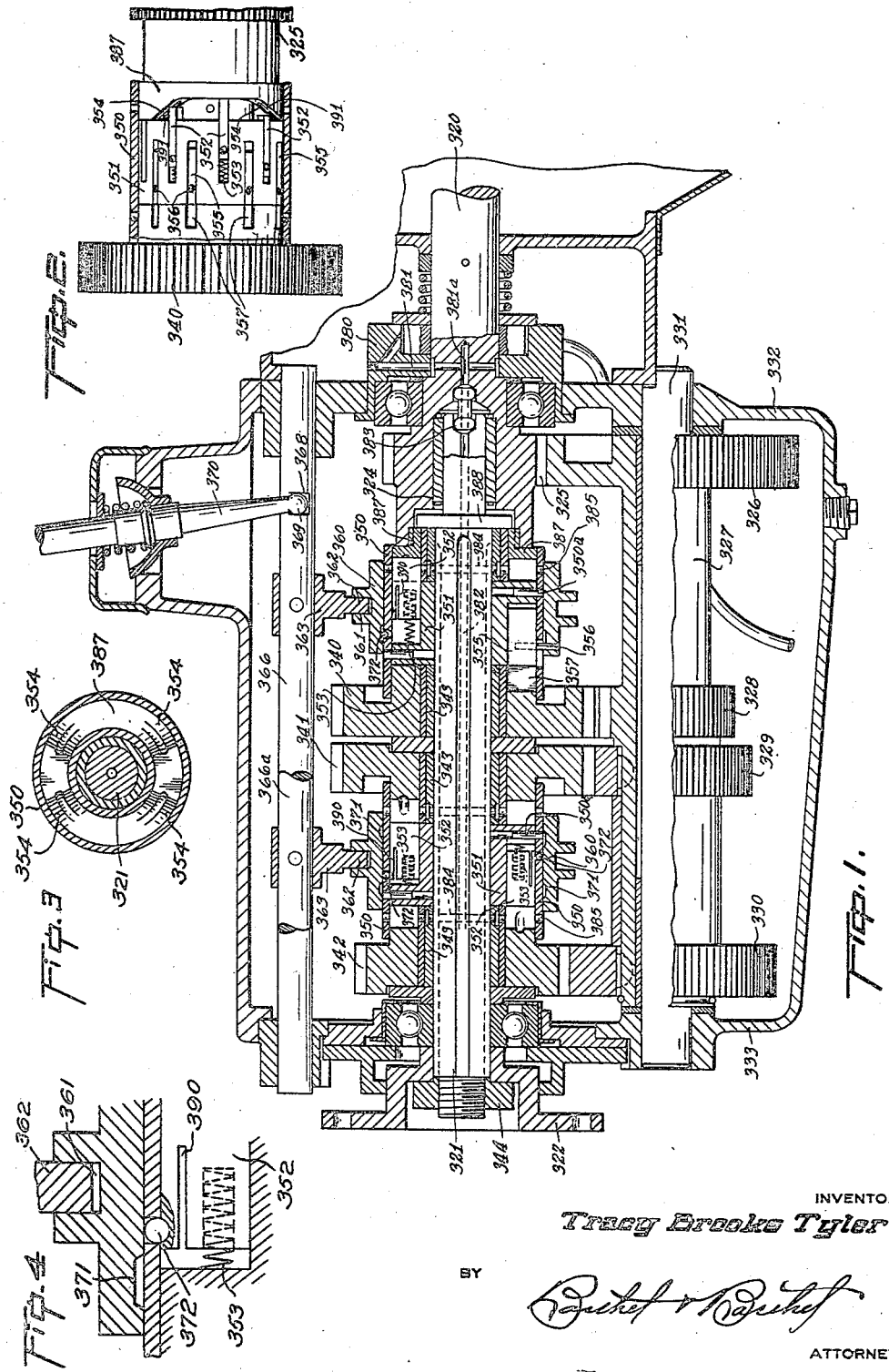
INVENTOR
*Tracy Brooks Tyler*
BY
ATTORNEYS Patented May 25, 1937

2,081,689

UNITED STATES PATENT OFFICE 2,081,689

TRANSMISSION

Tracy Brooks Tyler, Detroit, Mich., assignor to The Monopower Corporation, Detroit, Mich., a corporation of Michigan Application June 8, 1932, Serial No. 616,142

14 Claims. (Cl. 192—58)

This invention relates to transmissions.

An object of the present invention is to provide a transmission more or less like that disclosed in the drawing of my copending application, Serial No. 615,631, filed June 6, 1932, but differing therefrom in that fluid pressure clutches are used in lieu of the friction clutches there disclosed.

In the illustrated embodiment of the invention the fluid pressure clutches are like those disclosed in figures of my copending application, Serial No. 614,745, filed June 1, 1932, though it will of course be understood that other fluid clutches might be used in the transmission here disclosed, with attendant benefits or disadvantages, as the case may be.

Other objects will become apparent upon reference to the following detailed description and to the appended drawing in which Fig. 1 shows an embodiment of the invention;

Fig. 2 shows a detail of the embodiment of Fig. 1;

Fig. 3 is a transverse section taken in a plane to illustrate the face of the cam faced drive member, and Fig. 4 is a fragmental view illustrating a detail.

Referring to the drawing, it will be seen that the transmission includes a driving shaft 320 and a driven shaft 321, the latter being connected through a coupling 322 to a propeller shaft. The shaft 320 is cupped as at 324 to receive and journal the end of the shaft 321 and is further provided with a gear 325 meshing with a gear 326 of a sleeve 327, the latter further having gears 328, 329 and 330 and being journaled on a stationary longitudinal countershaft 331 supported in the opposed walls 332, 333 of the transmission casing. The gears 328, 329, 330 are in constant mesh with gears 340, 341, 342, respectively, running free on sleeves 343 fixed on the shaft 321 and retained against axial movement thereon, together with the gears 340, 341, 342, by spacer sleeves, abutments on the parts, etc., and a nut like plate 344 threaded on to the end of shaft 321, all of the parts being thus held against axial movement on the shaft 321 during the operation of the device.

It will be observed at this time that the gears 328–340 which form the reverse drive, are meshed not directly but through an idler gear not shown.

Between each set of gears 325–340 and 341—342 is a casing 350 fixed by pins 350a to rotors 351 splined to the spline shaft 321. These rotors have circumferentially spaced, on their peripheral walls, a plurality of slots staggered so that they open alternately towards the opposite gears between which the casing and rotor is disposed, substantially as indicated in Fig. 2.

In the right hand set of slots are sliding vanes 352 provided with compression springs 353 tending to urge these vanes out of the slots and into the space between the rotor 351 and a plate 397 splined to the gear 325. This plate has camming surfaces 354 also projecting into the space to form seals with the vanes and are also adapted to cause the vanes to retract into their slots, in a manner that will be described later.

In the left hand set of slots are vanes 355, adapted to be projected into the notches 357 cut into the hub of gear 340, in the manner of a positive tooth clutch.

A second casing 350 is disposed between gears 341—342 and this casing, as distinguished from the above mentioned casing has two sets of fluid intercepting vanes 352, etc., rather than but one set of sliding vanes 352.

Surrounding each casing is a grooved ring 360 in whose groove 361 is secured the yoked ends 362 of a fork 363, these forks being secured individually to the parallel adjacent shifter rails 366—366a, mounted to be slidable in the transmission casing as indicated. On adjacent faces of these rails are notches 368 into either of which may be thrust the ball end 369 of a pivotally mounted shift lever 370. Each grooved ring 360 is provided with longitudinally spaced annular internal grooves or reliefs 371 adapted to accommodate the annular rows of balls 372 disposed in annular rows of peripherally drilled holes of the casing 350. It will be understood that, in the form shown, there is one row of balls for each set of sliding vanes 352, with one ball for each vane.

Disposed on shaft 320 is a low pressure pump 380 similar to the pump disclosed in application Serial No. 614,745, filed June 1, 1932, and having an exhaust port 381 in casing 380 communicating with shaft port 381a through which fluid may be discharged at a low pressure into the axial conduit 382 of the spline shaft 321, there being a double ball-end fitting 383 for effecting a substantially sealed communication between the port 381a and the conduit 382, regardless of the alignment of shafts 320—321. The conduit 382 has radial ports 384 opening into the spaces between the rotors and the gears 325, 341 and 342, which, in effect, form end plates for the casings 350, and these spaces have exhaust ports 385, as indicated.

The operation of the device will readily be seen from the foregoing. When shifter rail 366 is moved to the right by the lever 370, or when shifter rail 366a is moved to the left or right, by lever 370, from neutral position, the fork carried by the moved rail will move to the left or right, as the case may be, and will move the grooved ring 360 so that one of its reliefs 371, will accommodate one of the rows of balls on one set of vanes in one rotor so as to relieve these vanes and permit the coiled springs 353 to project these vanes into the fluid filled space between the rotor and the adjacent gear to establish a driving connection from a gear through a casing 350, the fluid in the casing, the projected vanes, and the rotor. At this time, one set of ports 385 will be closed by the ring 360 and the spaces will be filled with fluid. Since the rotor is splined to the shaft 321 the latter will be driven by the gear which happens to be selected, that is, the one adjacent to such vanes as may be projected.

In one case, where the right hand set of vanes on the right hand rotor is projected, as indicated, the drive is through the plate 387, which is splined to shaft 320, and is disposed between a shaft enlargement 388 and a rotor, and in effect acts like one of the gears. This plate prevents fluid pressure from acting to separate shafts 320 and 321, axially.

In order to prevent too great a pressure being built up in the ends of spaces between the rotors and the gears 325, 341, 342, the camming surfaces of the latter are provided with reliefs 391 which by-pass the ends of the vanes.

Reverse movement of the shifter lever will cause grooved ring 360 to uncover the closed ports 385 and relieve the fluid pressure in the closed space, whereupon the gear (or the plate 387) will move relatively to the rotor and vanes so that its camming surfaces which form the driving seal 354 will retract the projected vanes. These are then held in retracted position by the balls thereon, projected inwardly by the grooved ring which has moved so that its reliefs are no longer in line with the balls. It will be observed that the vanes are slotted, at 390, so as to form a spring tongue with a recess in the end to snap over and seat under balls 372 so as to be capable of being held in by the balls.

For reverse drive, the right hand ring 360 is moved to the left and the vanes 355 are moved therewith, by pins 356, into the slots 357 of the hub of gear 340, in the manner of a positive tooth clutch. This type of clutch is more desirable for reverse than a fluid clutch since it discourages and forestalls any successful attempt to shift into reverse while the vehicle is moving forwardly and while rotor 351 is rotating.

It will be observed that except for the specific form of the clutches, the transmission here disclosed is more or less like that of application Serial No. 615,631, and consequently possesses many of the advantages inherent to that transmission.

It will also be observed that the use of clutches like those of application in Serial No. 614,745 causes the transmission disclosed to possess many advantages over other transmissions, such advantages not being here listed.

Now having described the invention and a preferred embodiment of the same, reference will be had to the following claims which define the scope of the invention.

What I claim is:

1. The combination with a rotor, of a cam faced drive member co-axial with and rotatable freely relative to said rotor, vanes mounted in said rotor, means for projecting said vanes into contact with said cam faced drive member, a casing surrounding said rotor and a portion of said drive member, means for introducing fluid into said casing, and control means for exhausting said fluid from said casing.

2. The combination with a cam faced drive member, of a driven member having a plurality of vanes, means for projecting said vanes into contact with said cam faced drive member, means for enclosing said vanes and cam faced drive member, means for pumping fluid into said enclosing means, and control means for exhausting said fluid from said enclosing means.

3. The combination with a rotor, of a cam faced drive member co-axial with and rotatable freely relative to said rotor, vanes mounted in said rotor, means for projecting said vanes into contact with said cam faced drive member, a casing surrounding said rotor and a portion of said drive member, means for introducing fluid into said casing, means for holding said vanes in a retracted position, and means operable simultaneously with said last named means for exhausting the fluid from said casing.

4. The combination with a rotor, of a cam faced drive member co-axial with and rotatable freely relative to said rotor, vanes mounted in said rotor, means for projecting said vanes into contact with said cam faced drive member, a casing surrounding said rotor and a portion of said drive member, means for pumping liquid into said casing, means for holding said vanes in a retracted position, means for exhausting fluid from said casing, and means for simultaneously actuating said vane holding means and said fluid exhausting means.

5. The combination with a cam faced drive member, of a driven member having a plurality of vanes, means for projecting said vanes into contact with said cam faced drive member, means for enclosing said vanes and cam faced drive member, means for supplying fluid to said enclosing means, manually operable means for holding said vanes in a retracted position, and means controlled by said manually operable means for discharging fluid from said enclosing means.

6. The combination with a rotor, of a cam faced drive member, slots in said rotor, vanes in said slots, resilient means urging said vanes into contact with said cam surface, a casing enclosing said vanes and cam faced drive member, means for supplying fluid into said casing, and control means for exhausting said fluid from said casing.

7. The combination with a rotor, of a cam faced drive member, slots in said rotor, vanes in said slots, resilient means urging said vanes into contact with said cam surface, a casing enclosing said vanes and cam faced drive member, means for supplying fluid to said casing, means carried by said casing and adapted to engage said vanes to hold the same in a retracted position, and control means for exhausting said fluid from said casing.

8. The combination with a rotor, of a cam faced drive member, slots in said rotor, vanes in said slots, resilient means urging said vanes into contact with said cam surface, a casing enclosing said vanes and cam faced drive member, means for supplying fluid to said casing, personally operable means for engaging said vanes to maintain the same in a retracted position, and means actuated by said personally operable means for exhausting said fluid from said casing.

9. The combination with a cam faced drive member, of a driven member carrying a plurality of movable vanes, means normally urging said vanes into contact with said cam faced drive member, a casing enclosing said vanes and cam faced drive member, means for supplying fluid within said casing adjacent said vanes and cam faces, means in said casing for holding said vanes in a retracted position, and controlled parts in said casing for exhausting said fluid therefrom.

10. The combination with a cam faced drive member, of a driven member carrying a plurality of movable vanes, means normally urging said vanes into contact with said cam faced drive member, a casing enclosing said vanes and cam faced drive member, means for supplying fluid within said casing adjacent said vanes and cam faces, means in said casing for holding said vanes in a retracted position, manual means for releasing said means in said casing and means for exhausting said fluid from said casing.

11. The combination with a cam faced drive member, of a driven member carrying a plurality of movable vanes, means normally urging said vanes into contact with said cam faced drive member, a casing enclosing said vanes and cam faced drive member, means for supplying fluid within said casing adjacent said vanes and cam faces, means in said casing for holding said vanes in a retracted position, slidable means on said casing for engaging said means in said casing whereby the latter are adapted to be released by sliding movement of said slidable means, manual means for sliding said slidable means, and ports for exhausting said fluid from said casing, said ports being adapted to be closed and opened by movement of said slidable means.

12. The combination with a cam faced drive member, of a driven member, vanes carried by said driven member, a casing surrounding said vanes and cam faced drive member, means for supplying fluid within said casing, means for projecting said vanes into contact with said cam faced drive member, and manually controlled means for exhausting said fluid from said casing.

13. The combination with a cam faced drive member, of a driven member, vanes carried by said drive member, flexible portions on said vanes, a casing enclosing said vanes and cam faced drive member, means normally urging said vanes to an extended position where they contact with said cam faced drive member, means carried by said casing and adapted to be moved into or out of engagement with said vanes to hold the same in a retracted position or to release said vanes, means for supplying fluid within said casing, and control means for exhausting said fluid from said casing.

14. The combination with a cam faced drive member, of a driven member, vanes carried by said driven member, flexible portions on said vanes, a casing enclosing said vanes and cam faced drive member, means normally urging said vanes to an extended position where they contact with said cam faced drive member, means carried by said casing and adapted to be moved into or out of engagement with said vanes to hold the same in a retracted position or to release said vanes, means for supplying fluid within said casing, manual means for actuating said vane holding means, and control means actuated by said manual means for exhausting fluid from said casing.

TRACY BROOKS TYLER.